United States Patent
Choi et al.

(10) Patent No.: US 8,781,486 B1
(45) Date of Patent: Jul. 15, 2014

(54) RESOURCE ALLOCATION AND BAND ASSIGNMENT IN CARRIER-AGGREGATED WIRELESS NETWORKS

(71) Applicant: Marvell International Ltd., Hamilton (BM)

(72) Inventors: Jihwan P. Choi, San Jose, CA (US); Ying Cai, Santa Clara, CA (US); Jiwoong Choi, Mountain View, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/646,461

(22) Filed: Oct. 5, 2012

Related U.S. Application Data

(60) Provisional application No. 61/547,338, filed on Oct. 14, 2011.

(51) Int. Cl.
*G06F 15/16* (2006.01)
(52) U.S. Cl.
USPC .......................................... 455/450; 370/329

(58) Field of Classification Search
USPC ...................... 455/437, 438, 450, 509, 550.1; 370/328, 329, 331, 338
See application file for complete search history.

(56) References Cited

U.S. PATENT DOCUMENTS

2013/0083767 A1* 4/2013 Goto et al. .................... 370/329

OTHER PUBLICATIONS

"IEEE Std 802.16 2009 (Revision of IEEE Std. 802.16-2004), IEEE Standard for Local and metropolitan area networks: Part 16: Air Interface for Broadband Wireless Access Systems," *The Institute of Electrical and Electronics Engineers, Inc.*, May 29, 2009.
Wannstrom, "Carrier Aggregation explained," *The 3rd Generation Partnership Project*, pp. 1-6 May 2012, available at http://www.3gpp.org/Carrier-Aggregation-explained.

* cited by examiner

*Primary Examiner* — Sam Bhattacharya

(57) ABSTRACT

In a wireless communication system including a plurality of client stations including at least one client station that is not configured to utilize carrier aggregation, different coverage areas correspond to different frequency bands being utilized. Wireless medium resources are allocated and frequency band (s) are assigned, jointly, to the client stations based on one or more coverage areas corresponding to one or more frequency bands in which each client station is located, whether client stations are configured to utilize carrier aggregation, demand factors, and indications of channel quality.

20 Claims, 5 Drawing Sheets

RESOURCE ALLOCATION AND BAND ASSIGNMENT IN CARRIER-AGGREGATED WIRELESS NETWORKS

CROSS-REFERENCE TO RELATED APPLICATION

This disclosure claims the benefit of U.S. Provisional Patent Applications No. 61/547,338, entitled "Resource Allocation and Band Assignment in Carrier-Aggregated Wireless Networks," filed on Oct. 14, 2011, which is hereby incorporated by reference herein in its entirety.

FIELD OF TECHNOLOGY

The present disclosure relates generally to wireless communication networks and, more particularly, to resource allocation in a wireless communication network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some wireless communication systems, such as mobile telephony systems and systems employing technologies proffered by the $3^{rd}$ Generation Partnership Project (3GPP) (e.g., the High-Speed Packet Access (HSPA) standard, the Evolved High-Speed Packet Access (HSPA+) standard, the Long Term Evolution (LTE) standard, etc.) and the IEEE 802.16 family of communication standards, include one or more base stations and two or more client stations that communicate with the one or more base stations by transmitting data in a plurality of time and frequency slots. A base station needs to allocate wireless medium resources (e.g., time and/or frequency) among the client stations. For example, if the base station serves five clients, but only needs to transmit data to two of the clients, the base station may allocate downlink wireless medium resources only to the two clients for which the base station has data. On the other hand, if all of the five stations have data to transmit to the base station, but one of the stations has much more data than the other stations, the base station may allocate uplink wireless medium resources to all of the clients, but allocate more resources to the one station with the greater amount of data.

SUMMARY

In one embodiment, a method is for resource allocation in a wireless communication system utilizing a plurality of frequency bands corresponding to respective coverage areas, the wireless communication system including a plurality of client stations including at least one client station that is not configured to utilize carrier aggregation. The method includes, for each client station in the plurality of client stations, determining, at a base station, within which coverage area or areas the client station is located, wherein the coverage area or areas are from the coverage areas corresponding to the plurality of frequency bands. Also, the method includes, for each of at least client stations in the plurality of client stations determined to be within multiple coverage areas, determining, at the base station, whether the client station is configured to utilize carrier aggregation. The method additionally includes, for each client station in the plurality of client stations, determining, at the base station, one or more demand factors indicative of a need of the client station for wireless medium resources. The method further includes, for each client station in the plurality of client stations, and for each frequency band that the client station is within the corresponding coverage area, determining, at the base station, an indication of channel quality corresponding to the channel, at the frequency band, between the base station and the client station. Additionally, the method includes jointly (i) allocating wireless medium resources and (ii) assigning each client stations in the plurality of stations to at least one of the frequency bands, wherein jointly allocating wireless medium resources and assigning client stations to at least one of the frequency bands is based on (i) the one or more coverage areas corresponding to one or more frequency bands in which each client station is located, (ii) for each of at least some of the client stations, whether the client station is configured to utilize carrier aggregation, (iii) the demand factors, and (iv) the indications of channel quality.

In another embodiment, a wireless communication device is configured to allocate resources in a wireless communication system utilizing a plurality of frequency bands corresponding to respective coverage areas, the wireless communication system including a plurality of client stations including at least one client station that is not configured to utilize carrier aggregation. The wireless communication device comprises a network interface configured to utilize carrier aggregation, and a processor. The processor is configured to: (i) for each client station in the plurality of client stations, determine within which coverage area or areas the client station is located, wherein the coverage area or areas are from the coverage areas corresponding to the plurality of frequency bands, (ii) for each of at least client stations in the plurality of client stations determined to be within multiple coverage areas, determine whether the client station is configured to utilize carrier aggregation, (iii) for each client station in the plurality of client stations, determine one or more demand factors indicative of a need of the client station for wireless medium resources, (iv) for each client station in the plurality of client stations, and for each frequency band that the client station is within the corresponding coverage area, determine an indication of channel quality corresponding to the channel, at the frequency band, between the base station and the client station, and (v) jointly (a) allocate wireless medium resources and (b) assign each client stations in the plurality of stations to at least one of the frequency bands, wherein jointly allocating wireless medium resources and assigning client stations to at least one of the frequency bands is based on (a) the one or more coverage areas corresponding to one or more frequency bands in which each client station is located, (b) for each of at least some of the client stations, whether the client station is configured to utilize carrier aggregation, (c) the demand factors, and (d) the indications of channel quality.

In another embodiment, a non-transient computer readable storage medium has instructions stored thereon that, when executed by one or more processors, cause the one or more processors to: (i) for each client station in a plurality of client stations of a wireless communication system, determine within which coverage area or areas the client station is located, wherein the coverage area or areas are from the coverage areas corresponding to a plurality of frequency bands served by a base station, (ii) for each of at least client stations in the plurality of client stations determined to be within multiple coverage areas, determine whether the client station is configured to utilize carrier aggregation, (iii) for each client station in the plurality of client stations, determine one or more demand factors indicative of a need of the client station for wireless medium resources, (iv) for each client station in the plurality of client stations, and for each frequency band that the client station is within the corresponding coverage area, determine an indication of channel quality corresponding to the channel, at the frequency band, between the base station and the client station, and (v) jointly (a) allocate wireless medium resources and (b) assign each client stations in the plurality of stations to at least one of the frequency bands, wherein jointly allocating wireless medium resources and assigning client stations to at least one of the frequency bands is based on (a) the one or more coverage areas corresponding to one or more frequency bands in which each client station is located, (b) for each of at least some of the client stations, whether the client station is configured to utilize carrier aggregation, (c) the demand factors, and (d) the indications of channel quality.

BRIEF DESCRIPTION OF THE DRAWINGS

Like reference symbols in the various drawings indicate like elements.

DETAILED DESCRIPTION

In embodiments described below, a wireless communication network includes a base station and a plurality of client devices. The base station is capable of carrier aggregation (CA), which involves aggregating multiple distinct communication channels at different frequency bands into a single logical channel. In an embodiment, the base station is capable of transmitting and receiving, at the same time, on a plurality of frequency bands including (i) a first frequency band, and (ii) a second frequency band. A first set of one or more client devices is capable of at least receiving, at the same time, on multiple frequency bands. Client devices in the first set of one or more client devices are referred to herein as carrier aggregation capable (CA-capable) devices. A second set of one or more client devices is capable of transmitting and receiving on only one of the frequency bands at a given time. Client devices in the second set of one or more client devices are referred to herein as carrier aggregation incapable (CA-incapable) devices.

In embodiments described below, the base station is configured to allocate wireless communication medium resources in an aggregate channel comprising a plurality of distinct communication channels corresponding to a plurality of frequency bands. Additionally, in embodiments described below, the base station is configured to assign client stations to the plurality of frequency bands. In embodiments described below, the base station performs (i) allocating wireless communication medium resources in the plurality of frequency bands, and (ii) assignment of client stations to the plurality of frequency bands, jointly based on various factors including the capability of each device to utilize carrier aggregation (CA). In some embodiments, the base station employs a suitable optimization scheme to jointly (i) allocate wireless communication medium resources in the plurality of frequency bands, and (ii) assign client stations to the plurality of frequency bands.

Figure 1:
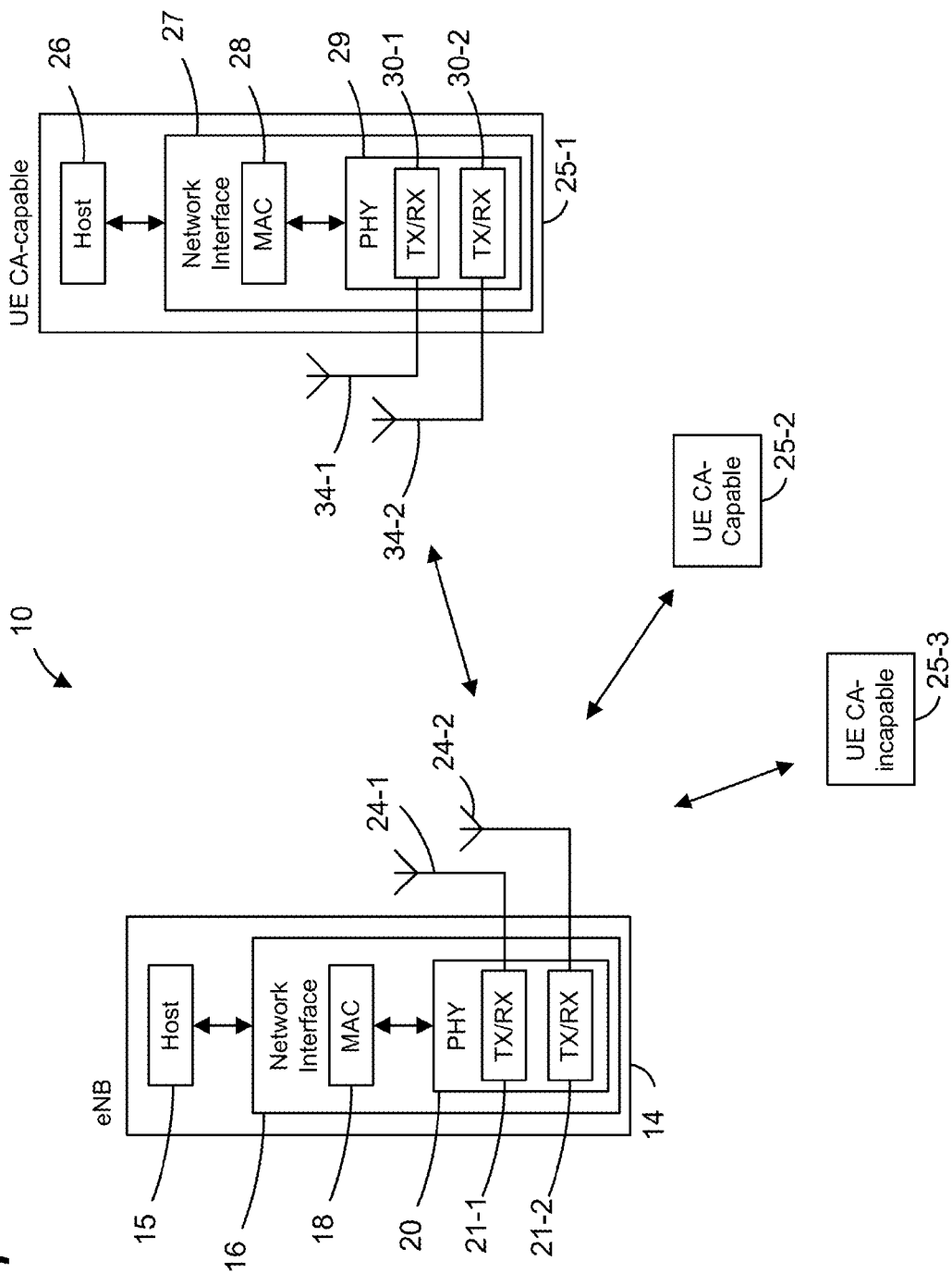
FIG. 1 is a block diagram of an example wireless communication network, according to an embodiment.

FIG. 1 is a block diagram of an example wireless communication network 10, according to an embodiment. An Evolved Node B (eNB) device 14, also referred to herein as a base station, includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although two transceivers 21 and two antennas 24 are illustrated in FIG. 1, the AP 14 can include different numbers (e.g., 3, 4, 5, etc.) of transceivers 21 and antennas 24 in other embodiments. In some embodiments, multiple transceivers 21 are coupled to the same antenna. Additionally, in some embodiments, the base station 14 is configured to utilize antenna diversity, antenna beamforming, and/or a multiple input, multiple output (MIMO) technique such as spatial multiplexing. The number of antennas 24 need not be the same as the number of transceivers 21.

The base station 14 is configured to utilize carrier aggregation (CA). Carrier aggregation involves aggregating multiple distinct communication channels at different frequency bands into a single logical connection. In an embodiment, one or several of the transceivers 21, each or collectively, includes multiple radios configured to transmit and receive over multiple frequency bands. In an embodiment, one or more of the transceivers 21, each or collectively, utilizes a wideband radio configured to transmit and receive over a wide frequency encompassing multiple frequency bands. The network interface 16, e.g., the MAC processing unit 18 and/or the PHY processing unit 20, is configured to utilize CA techniques.

The network 10 includes a plurality of user equipment (UE) devices 25, also referred to herein as client stations. Although three client stations 25 are illustrated in FIG. 1, the WLAN 10 can include different numbers (e.g., 1, 2, 4, 5, 6, etc.) of client stations 25 in various scenarios and embodiments.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although two transceivers 30 and two antennas 34 are illustrated in FIG. 1, the client station 25-1 can include different numbers (e.g., 3, 4, 5, etc.) of transceivers 30 and antennas 34 in other embodiments. In some embodiments, multiple transceivers 30 are coupled to the same antenna. Additionally, in some embodiments, the client station 25-1 is configured to utilize antenna diversity, antenna beamforming, and/or a multiple input, multiple output (MIMO) technique such as spatial multiplexing. The number of antennas 34 need not be the same as the number of transceivers 30.

The client station 25-1 is configured to utilize CA techniques. In an embodiment, one or several of the transceivers 30, each or collectively, includes multiple radios configured to transmit and receive over multiple frequency bands. In an embodiment, one or more of the transceivers 30, each or collectively, utilizes a wideband radio configured to transmit and receive over a wide frequency encompassing multiple frequency bands. The network interface 27, e.g., the MAC processing unit 28 and/or the PHY processing unit 29, is configured to utilize CA techniques.

In an embodiment, the client station 25-2 has a structure the same as or similar to the client station 25-1, and the client station 25-2 is configured to utilize CA techniques. In these embodiments, the client station 25-2 has the same or a different number of transceivers and antennas. For example, the client station 25-2 has only three transceivers and three antennas, according to an embodiment.

The client station 25-3 is not capable of utilizing CA techniques. In an embodiment, the client station 25-3 has a structure similar to the client station 25-1. In some embodiments, the client station 25-3 has the same or a different number of transceivers and antennas as compared to the client station 25-1. For example, the client station 25-3 has only one transceiver and only one antenna, according to an embodiment. In another embodiment, the client station 25-3 has multiple transceivers and/or multiple antennas.

Figure 2:
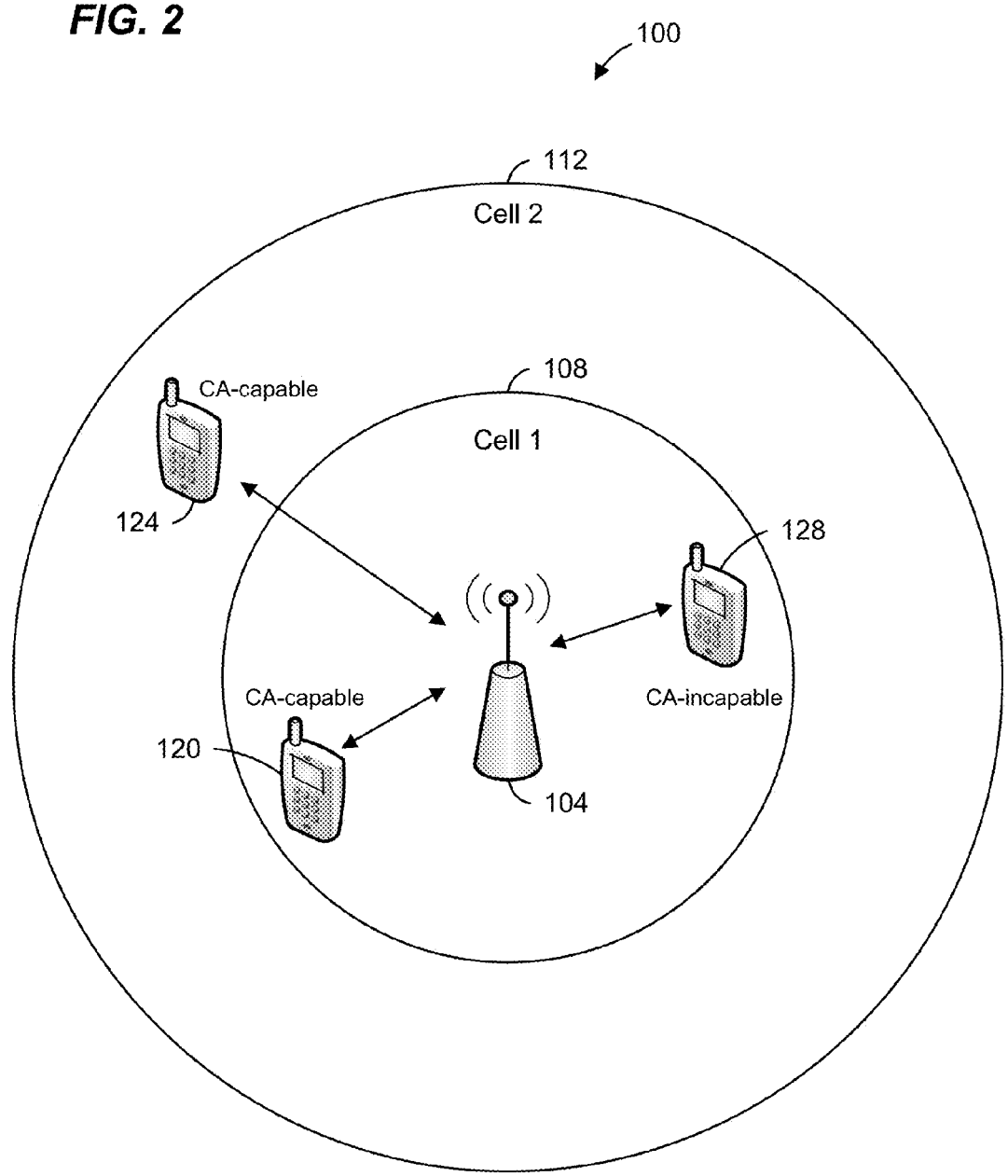
FIG. 2 is a diagram of an example wireless communication network, according to an embodiment.

FIG. 2 is a diagram of an example wireless communication network 100, according to an embodiment. The network 100 includes a base station 104 that is configured to utilize CA techniques. The base station 104 is the base station 14 of FIG. 1, in an embodiment. The base station 104 is configured to transmit and receive on a plurality of communication channels corresponding to a plurality of distinct frequency bands, including a first frequency band and a second frequency band.

The different frequency bands have different coverage areas, in some scenarios. The different coverage areas may be due one or both of (i) different propagation characteristics at different frequencies, and (ii) different power levels of different radios corresponding to the different frequency bands. For example, the first frequency band (Cell 1) corresponds to a coverage area 108, whereas the second frequency band (Cell 2) corresponds to a coverage area 112, which is larger than the coverage area 108. In one embodiment, the first frequency band corresponds to a carrier at 2.1 MHz, whereas the second frequency band corresponds to a carrier at 1.9 MHz. In an embodiment, the larger coverage area 112 of Cell 2 (as compared to the coverage area 108 of Cell 1) is due at least to propagation characteristics at 2.1 MHz versus 1.9 MHz. In other embodiments, other suitable carriers are utilized. In one embodiment, the first frequency band corresponds to a carrier at a lower frequency than the second frequency band, and the larger coverage area 112 of Cell 2 (as compared to the coverage area 108 of Cell 1) is due to relative power levels of different radios utilized for the first frequency band and the second frequency band.

The network 100 includes a client station 120 that is configured to utilize CA techniques. The client station 120 is located within both of Cell 1(108) and Cell 2 (112). The network 100 also includes a client station 124 that is configured to utilize carrier aggregation. The client station 124 is located within Cell 2 (112) but outside of Cell 1 (108). The network 100 also includes a client station 128 that is not configured to utilize carrier aggregation. In the scenario illustrated in FIG. 2, the client station 128 is located within both of Cell 1 (108) and Cell 2 (112).

Figure 3A:
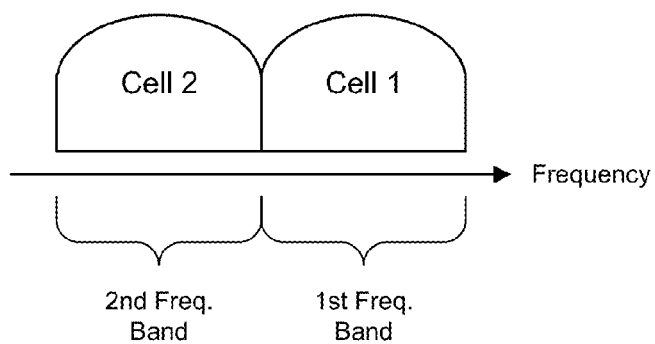
FIGS. 3A and 3B are plots versus frequency of frequency bands utilized in the wireless communication network of FIG. 2, according to various embodiments and/or scenarios.
Figure 3B:
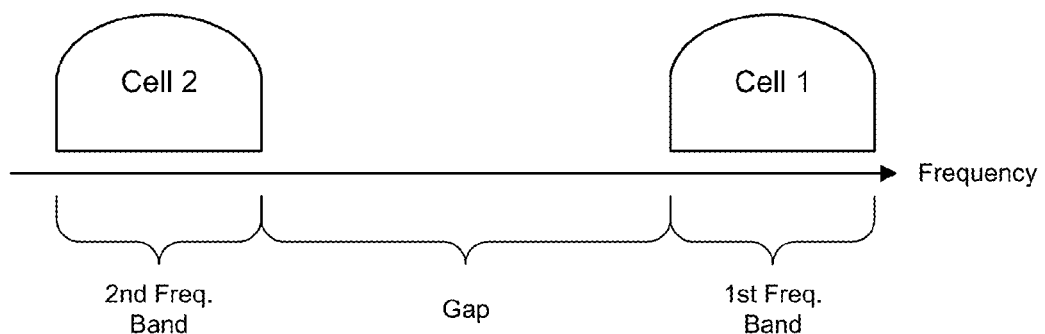

The first frequency band and the second frequency band are contiguous in frequency, in at least some embodiments and/or scenarios. FIG. 3A is a plot versus frequency of the first frequency band and the second frequency band when the first frequency band and the second frequency band are contiguous frequency bands. On the other hand, in at least some embodiments and/or scenarios, first frequency band and the second frequency band are not contiguous in frequency. FIG. 3B is a plot versus frequency of the first frequency band and the second frequency band when the first frequency band and the second frequency band are not contiguous in frequency. In particular, as shown in FIG. 3B, a gap in frequency occurs between the first frequency band and the second frequency band. In some embodiments, the gap has a width at least as large as the first frequency band and/or the second frequency band.

Referring again to FIG. 2, three types of client stations are illustrated: (i) CA-capable client stations within both of Cell 1 and Cell 2 (e.g., client station 120), (ii) CA-incapable client stations within both of Cell 1 and Cell 2 (e.g., client station 128), and (iii) client stations within Cell 2 but outside of Cell 1, regardless of CA capability. In an embodiment, the base station 104 is configured to jointly (i) allocate wireless medium resources to client stations of all three types, and (ii) assign frequency bands to client stations of all three types.

In an embodiment, wireless medium resources are allocated in units referred to herein as resource blocks (resource blocks). In an embodiment, the resource block has a defined time length. For example, in one embodiment, the length of the resource block is 1 millisecond (ms). In other embodiments, the resource block has other suitable time lengths. In orthogonal frequency domain multiple access (OFDMA) systems, the resource block has a defined frequency width. For example, in one embodiment, the RB has a width corresponding to one OFDMA subcarrier. In resource block embodiment, resource block has a width corresponding to a suitable number of OFDMA subcarriers different than one (e.g., a power of two, a multiple of two, a multiple of four, a multiple of five, a multiple of 12, such as in the LTE standard, etc.).

In embodiments with two frequency bands, the base station is configured to assign client devices, which are configured to utilize carrier aggregation, to one or both of the two frequency bands. Similarly, the base station is configured to assign client devices, which are not configured to utilize carrier aggregation, to only one of the two frequency bands.

Figure 4:
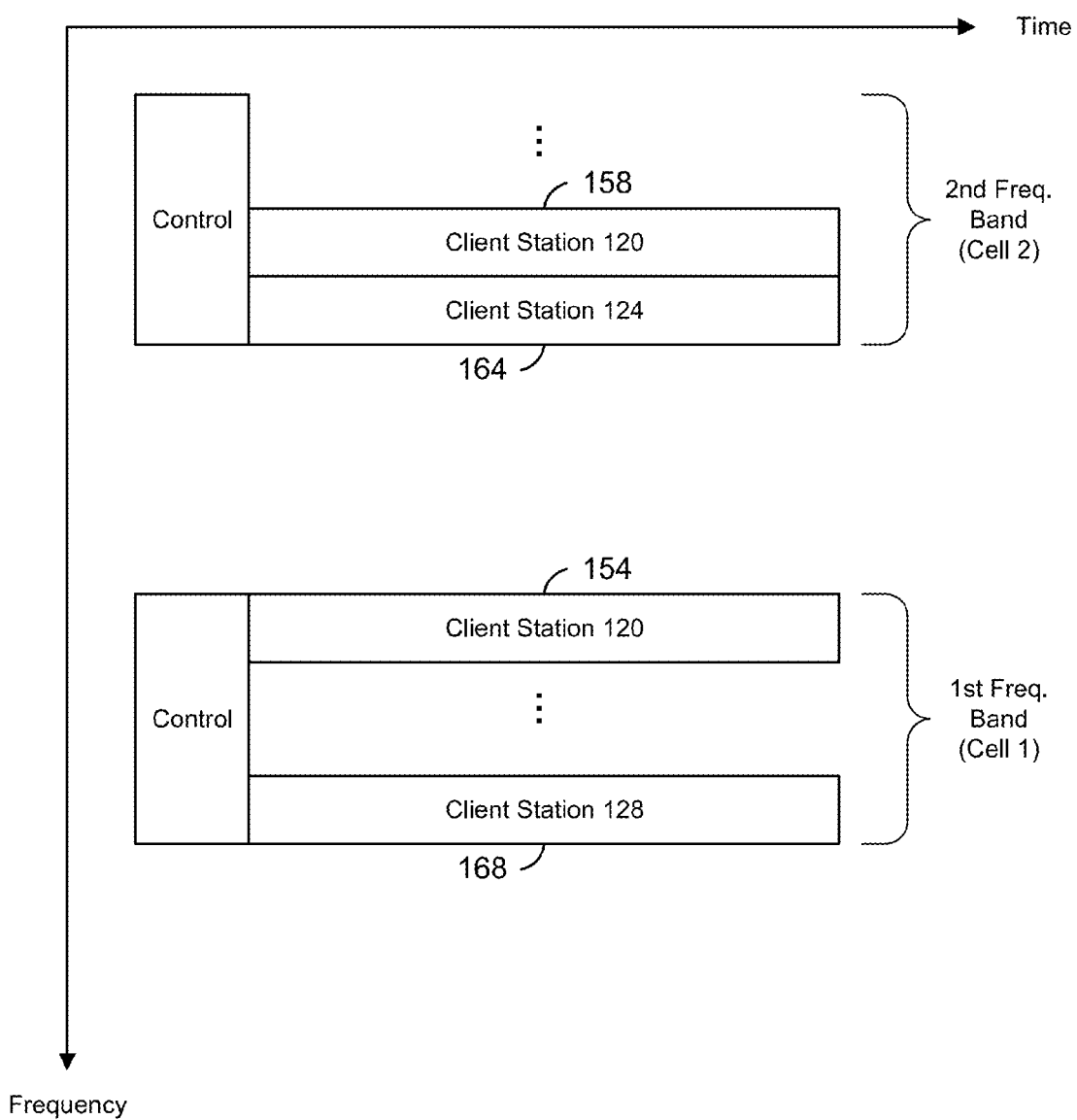
FIG. 4 is a diagram of an example result of joint allocation of wireless medium resources and band assignment, according to an embodiment.

FIG. 4 is a diagram illustrating an example result of joint allocation of resource blocks and frequency band assignment, according to an embodiment. The example of FIG. 4 corresponds to the example network 100 of FIG. 2. In the example of FIG. 4, the base station 104 allocated resource blocks 154 in the first frequency band and resource blocks 158 in the second frequency band to the client station 120, which is capable of carrier aggregation and which is in both Cell 1 and Cell 2. The base station 104 allocated resource blocks 164 in the second frequency band to the client station 124, which is only in Cell 2. The base station 104 allocated resource blocks 168 in the first frequency band to the client station 128, which is in both Cell 1 and Cell 2 but which is not capable of carrier aggregation.

In an embodiment, joint allocation of resource blocks and frequency band assignment performed by the base station is based on the capability to utilize carrier aggregation of each client station and the cell or cells in which each client station is located. In other embodiments, joint allocation of resource blocks and frequency band assignment performed by the base station is further based on one or more of (i) traffic demand, (ii) traffic throughput, (iii) channel quality (e.g., a channel quality indicator (CQI), signal-to-noise ratio, etc.) for each client station, (iv) quality of service requirements (e.g., maximum latency, etc.), etc. In some embodiments, joint allocation of resource blocks and frequency band assignment is performed by the base station according to a suitable optimization scheme.

Several example optimization schemes, according to various embodiments, for joint allocation of resource blocks and frequency band assignment are described below. The examples are described in the context of two frequency bands. In other embodiments, three or more frequency bands are utilized, and the techniques described for two frequency bands are scalable to three or more bands in a straightforward manner, in light of the present disclosure. Other suitable techniques for joint allocation of resource blocks and frequency band assignment are utilized in other embodiments.

$N_1$ is the total number of resource blocks available in the first frequency band (band 1), and $N_2$ is the total number of resource blocks available in the second frequency band (band 2). A total number of resource blocks in the band 1 assigned to an i-th user is $n_{1i}$, and a total number of resource blocks in the band 2 assigned to the i-th user is $n_{2i}$. For client stations not capable of carrier aggregation, $x_i$ is an indicator of the frequency band in which the i-th station will operate. For example, in one embodiment, $x_i=1$ indicates the i-th client station will operate in band 1, whereas $x_i=0$ indicates the i-th client station will operate in the band 2.

A data rate per resource block in band 1 for the i-th client station is $R_{1i}$, and a data rate per resource block in band 2 for the i-th client station is $R_{2i}$. In an embodiment, $R_{1i}$ is a function of the band 1 signal quality (e.g., CQI, SNR, etc.), and $R_{2i}$ is a function of the band 2 signal quality.

A set A ($a \in A$) of client stations corresponds to client stations that are configured to utilize carrier aggregation and are within both cell 1 (band 1) and cell 2 (band 2). A set B ($b \in B$) of client stations corresponds to client stations that are not configured to utilize carrier aggregation and are within both cell 1 (band 1) and cell 2 (band 2). A set C ($c \in C$) of client stations corresponds to client stations that are only within cell 2 (band 2), i.e., not in cell 1 (band 1), regardless of whether the client station is configured to utilize carrier aggregation.

Then, a constraint on the allocation of resource blocks in band 1 is:

$$\sum_{a \in A} n_{1a} + \sum_{b \in B} n_{1b} \cdot x_{1b} \leq N_1, \text{ and} \qquad \text{Equation 1}$$

whereas a constraint on the allocation of resource blocks in band 2 is:

$$\sum_{a \in A} n_{2a} + \sum_{b \in B} n_{2b} \cdot (1 - x_{1b}) + \sum_{c \in C} n_{2c} \leq N_2 \qquad \text{Equation 2}$$

where $N_1$ and $N_2$ may be different, at least in some embodiments, depending on available bandwidth.

The data rate, $r_a$, for the a-th user ($a \in A$), can be written as:

$$r_a = n_{1a} \cdot R_{1a} + n_{2a} \cdot R_{2a} \qquad \text{Equation 3}$$

Similarly, the data rate, $r_b$, for the b-th user ($b \in B$), can be written as:

$$r_b = n_{1b} \cdot x_{1b} \cdot R_{1b} + n_{2b} \cdot (1 - x_{1b}) \cdot R_{2b} \qquad \text{Equation 4}$$

Also, the data rate, $r_c$, for the c-th user ($c \in C$), can be written as:

$$r_c = n_{2c} \cdot R_{2c} \qquad \text{Equation 5}$$

In one embodiment, joint allocation of resource blocks and band assignment (band 1 or band 2) includes maximizing the minimum of weighted per-user data rates. In other words, joint allocation of resource blocks and band assignment includes maximizing:

$$\min_{i \in A \cup B \cup C} \frac{r_i}{w_i} \qquad \text{Equation 6}$$

where $w_i$ is a weight for the i-th user. In an embodiment, the weights w are determined based on traffic demand and/or throughput, in a suitable manner. In an embodiment, the optimization of maximizing the value in Equation 6 is subject to the following constraints: Equations 1-5, and $$n_{1a} \geq 0, n_{1b} \geq 0, n_{2a} \geq 0, n_{2b} \geq 0, n_{2c} \geq 0, \text{integer for every } a \in A, b \in B, c \in C, \text{and} \qquad \text{Equation 7}$$

$$x_{1b} = 0 \text{ or } 1, \text{ for every } b \in B \qquad \text{Equation 8}$$

The optimization problem described above with respect to Equations 1-8 may be solved using any suitable technique.

In another embodiment, joint allocation of resource blocks and band assignment (band 1 or band 2) includes a linear programming problem of maximizing an auxiliary variable R, subject to Equations 1, 2, 7, and 8, and the following constraints:

$$r_a = n_{1a} \cdot R_{1a} + n_{2a} \cdot R_{2a} \geq w_a R \qquad \text{Equation 9}$$

$$r_b = n_{1b} \cdot x_{1b} \cdot R_{1b} + n_{2b} \cdot (1 - x_{1b}) \cdot R_{2b} \geq w_b R \qquad \text{Equation 10}$$

$$r_c = n_{2c} \cdot R_{2c} \geq w_c R \qquad \text{Equation 11}$$

The optimization problem described above with respect to Equations 9-11 may be solved using any suitable technique. For example, a Simplex method is utilized in one embodiment.

In other embodiments, one or more client stations may have a respective minimum data rate requirement, such as reflecting a latency constraint and/or a quality of service (QoS) requirement. For example, in an embodiment, joint allocation of resource blocks and band assignment (band 1 or band 2) includes a linear programming problem of maximizing an auxiliary variable R, subject to Equations 1, 2, 7, and 8, and the following constraints:

$$r_a = n_{1a} \cdot R_{1a} + n_{2a} \cdot R_{2a} \geq \max(w_a R, R_{min,a}) \qquad \text{Equation 12}$$

$$r_b = n_{1b} \cdot x_{1b} \cdot R_{1b} + n_{2b} \cdot (1 - x_{1b}) \cdot R_{2b} \geq \max(w_b R, R_{min,b}) \qquad \text{Equation 13}$$

$$r_c = n_{2c} \cdot R_{2c} \geq \max(w_c R, R_{min,c}) \qquad \text{Equation 14}$$

In this embodiment, setting the weight $w_i$ to zero corresponds to a requirement that a minimum data rate, $R_{min,i}$, be supported for all of the client stations of the corresponding type (e.g., a, b, or c). Setting the minimum data rate, $R_{min,i}$, to zero corresponds to a requirement that best efforts be used for all of the client stations of the corresponding type (e.g., a, b, or c). Setting the weight $w_i$ to a non-zero value and setting the minimum data rate, $R_{min,i}$, to a non-zero value corresponds to a requirement that the minimum data rate, $R_{min,i}$, be supported for the i-th client station and best efforts be used for all of the other client stations of the corresponding type (e.g., a, b, or c).

The optimization problem described above with respect to Equations 12-14 may be solved using any suitable technique. For example, a Simplex method is utilized in one embodiment.

The optimization problem described above with respect to Equations 12-14 can be rewritten as a linear programming problem of maximizing an auxiliary variable R, subject to Equations 1, 2, 7, and 8, and the following constraints:

$$r_a = n_{1a} \cdot R_{1a} + n_{2a} \cdot R_{2a} \geq w_a R \qquad \text{Equation 15}$$

$$r_a = n_{1a} \cdot R_{1a} + n_{2a} \cdot R_{2a} \geq R_{min,a} \qquad \text{Equation 16}$$

$$r_b = n_{1b} \cdot x_{1b} \cdot R_{1b} + n_{2b} \cdot (1-x_{1b}) \cdot R_{2b} \geq w_b R \qquad \text{Equation 17}$$

$$r_b = n_{1b} \cdot x_{1b} \cdot R_{1b} + n_{2b} \cdot (1-x_{1b}) \cdot R_{2b} \geq R_{min,b} \qquad \text{Equation 18}$$

$$r_c = n_{2c} \cdot R_{2c} \geq w_c R \qquad \text{Equation 19}$$

$$r_c = n_{2c} \cdot R_{2c} \geq R_{min,c} \qquad \text{Equation 20}$$

The optimization problem described above with respect to Equations 15-20 may be solved using any suitable technique. For example, a Simplex method is utilized in one embodiment.

Equations 7 and 8 require each of various variables to be an integer. In one embodiment, a solution is found without constraining $n_{1a}$, $n_{1b}$, $n_{2a}$, $n_{2b}$, $n_{2c}$, $x_{1b}$ to be integers. Then, a suitable post-processing algorithm is applied, such as rounding off the values of $n_{1a}$, $n_{1b}$, $n_{2a}$, $n_{2b}$, $n_{2c}$, $x_{1b}$ to integer values. In another embodiment, an exhaustive search is performed with $x_{1b}=0$ or $x_{1b}=1$.

Figure 5:
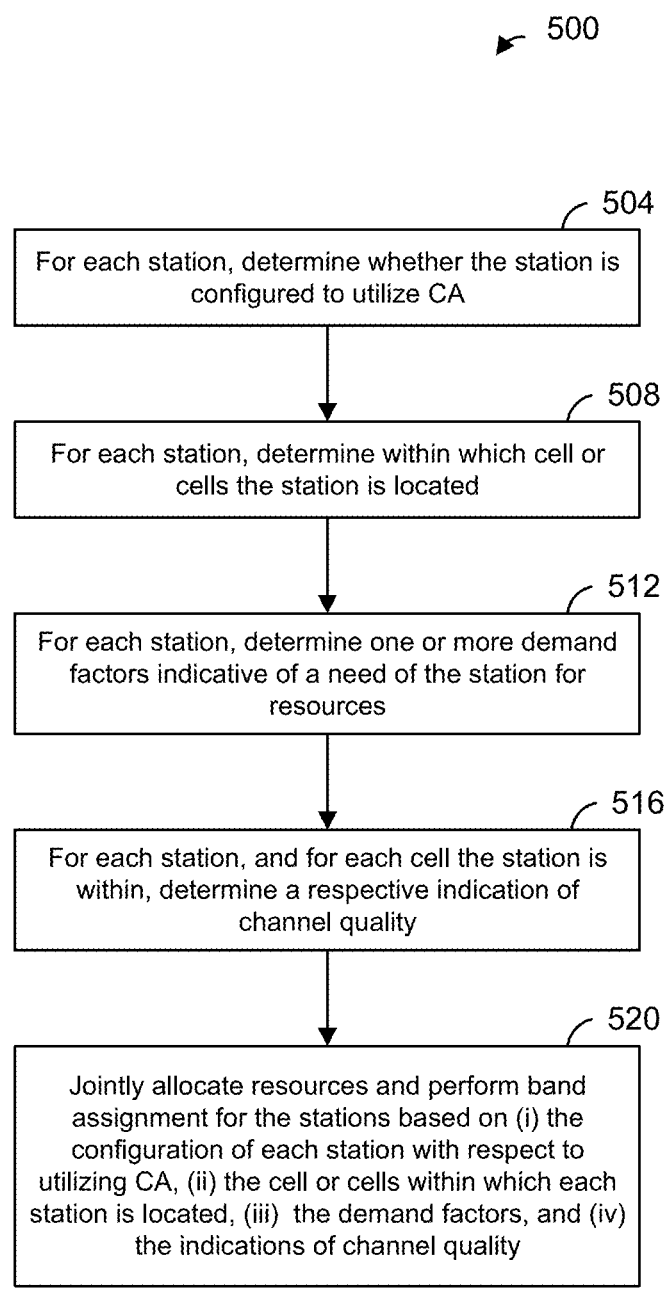
FIG. 5 is a flow diagram of an example method for joint allocation of wireless medium resources and band assignment, according to an embodiment.

FIG. 5 is a flow diagram of an example method 500 for allocating wireless medium resources and assigning client stations to frequency bands. The method 500 is implemented by a base station, such as the base station 14 (FIG. 1) or the base station 104 (FIG. 2), in an embodiment. For example, the method 500 is implemented by a processor of a base station, such as the host processor 15, or by the processor in combination with the network interface 16, in some embodiments. In some embodiments, the processor that implements, at least partially, the method 500 is included in the network interface 16.

At block 504, it is determined, for each client station being served by the base station in a wireless communication network, whether the client is configured to utilize carrier aggregation. In an embodiment, each client station transmits to the base station information indicating whether the client station is configured to utilize carrier aggregation. In an embodiment, the client station transmits the information indicating whether the client station is configured to utilize carrier aggregation in response to a prompt transmitted by the base station.

At block 508, it is determined, for each client station being served by the base station in a wireless communication network, the cell or cells of the base station within which the client station is located. Each cell corresponds to a respective frequency band. Referring to FIG. 2, for example, client stations 120 and 128 are within both cell 1 (corresponding to a first frequency band) and cell 2 (corresponding to a second frequency band), whereas client station 124 is within cell 2 but not within cell 1. Determining the cell or cells that a client station is within is performed in a suitable manner.

In an embodiment, block 504 is performed only with respect to client stations determined to be within multiple cells. For example, referring to FIG. 2, block 504 is not performed with respect to client station 124. In some embodiments, block 508 is performed prior to block 504.

At block 512, it is determined, for each client station, one or more demand factors indicative of a need for wireless medium resources. For example, the one or more demand factors include a minimum data rate, in an embodiment, such as $R_{min,i}$ discussed above. In another embodiment, the one or more demand factors include a weight, such as the weights $w_i$ discussed above. In some embodiments and/or scenarios, the one or more demand factors reflect, or are determined based on, one or more QoS requirements such as a latency constraint and/or a minimum throughput.

At block 516, it is determined, for each client station, and for each cell the station is within, an indication of channel quality. For example, in one embodiment, the indication of channel quality for a station/cell combination is, or is determined based on, a CQI, an SNR value, etc. For example, in one embodiment, the indication of channel quality includes a data rate per resource block in the frequency band corresponding to the cell, such as the $R_{1i}$ and $R_{2i}$ values discussed above.

At block 520, joint allocation of wireless medium resources and band assignment for the client stations served by the base station is performed. The joint allocation of wireless medium resources and band assignment is based on (i) the configuration of each of at least some of the client stations with respect to utilizing carrier aggregation, determined at block 504, (ii) the cell or cells within which each client station is located, determined at block 508, (iii) the demand factors determined at block 512, and (iv) the indications of channel quality determined at block 516. In some embodiments, block 520 is performed according to an optimization scheme. For example, in one embodiment, block 520 includes joint allocation of wireless medium resources and band assignment according to an optimization scheme that seeks to maximize a weighted minimum data rate for the client stations, such as described with respect to Equation 6. In an embodiment, block 520 includes joint allocation of wireless medium resources and band assignment according to an optimization scheme that seeks to maximize a weighted data rate for the client stations, such as described with respect to Equations 9-11. In another embodiment, block 520 includes joint allocation of wireless medium resources and band assignment according to an optimization scheme that seeks to maximize the maximum of (i) a weighted minimum data rate for the client stations, and (ii) a weighted data rate for the client stations, such as described with respect to Equations 12-14 or Equations 15-20.

At least some of the various blocks, operations, and techniques described above may be implemented utilizing hardware, one or more processors executing firmware instructions, one or more processors executing software instructions, or any combination thereof. Also, some of the various blocks, operations, and techniques may be performed in a different order (and/or concurrently) and still achieve desirable results. When implemented utilizing a processor executing software or firmware instructions, the software or firmware instructions may be stored in or on any non-transient, tangible computer readable medium such as a magnetic disk, an optical disk, a RAM or ROM, a flash memory, etc. In some embodiments, a computer readable medium is included in, or coupled to, one or more processors. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for resource allocation in a wireless communication system utilizing a plurality of frequency bands corresponding to respective coverage areas, the wireless communication system including a plurality of client stations including at least one client station that is not configured to utilize carrier aggregation, the method comprising:

for each client station in the plurality of client stations, determining, at a base station, within which coverage area or areas the client station is located, wherein the coverage area or areas are from the coverage areas corresponding to the plurality of frequency bands;

for each of at least client stations in the plurality of client stations determined to be within multiple coverage areas, determining, at the base station, whether the client station is configured to utilize carrier aggregation;

for each client station in the plurality of client stations, determining, at the base station, one or more demand factors indicative of a need of the client station for wireless medium resources;

for each client station in the plurality of client stations, and for each frequency band that the client station is within the corresponding coverage area, determining, at the base station, an indication of channel quality corresponding to the channel, at the frequency band, between the base station and the client station; and jointly (i) allocating wireless medium resources and (ii) assigning each client stations in the plurality of stations to at least one of the frequency bands, wherein jointly allocating wireless medium resources and assigning client stations to at least one of the frequency bands is based on (i) the one or more coverage areas corresponding to one or more frequency bands in which each client station is located, (ii) for each of at least some of the client stations, whether the client station is configured to utilize carrier aggregation, (iii) the demand factors, and (iv) the indications of channel quality.

2. A method according to claim 1, wherein jointly allocating wireless medium resources and assigning client stations to at least one of the frequency bands is performed according to an optimization scheme.

3. A method according to claim 2, wherein jointly allocating wireless medium resources and assigning client stations to at least one of the frequency bands is performed according to an optimization scheme that seeks to maximize a weighted minimum data rate for the client stations.

4. A method according to claim 2, wherein jointly allocating wireless medium resources and assigning client stations to at least one of the frequency bands is performed according to an optimization scheme that seeks to maximize a minimum data rate for the client stations.

5. A method according to claim 2, wherein jointly allocating wireless medium resources and assigning client stations to at least one of the frequency bands is performed according to an optimization scheme that seeks to maximize a weighted data rate for the client stations.

6. A method according to claim 1, wherein jointly allocating wireless medium resources and assigning client stations to at least one of the frequency bands comprises allocating resource blocks to the client stations, wherein each resource block is a minimum unit of wireless medium allocation.

7. A method according to claim 1, wherein determining one or more demand factors indicative of a need of the client station for wireless medium resources comprises determining a minimum data rate for the client station.

8. A method according to claim 1, wherein determining one or more demand factors indicative of a need of the client station for wireless medium resources comprises determining a weighted data rate for the client station.

9. A method according to claim 1, wherein determining one or more demand factors indicative of a need of the client station for wireless medium resources is based on one or more quality of service requirements of the client station.

10. A wireless communication device that is configured to allocate resources in a wireless communication system utilizing a plurality of frequency bands corresponding to respective coverage areas, the wireless communication system including a plurality of client stations including at least one client station that is not configured to utilize carrier aggregation, the wireless communication device comprising:
a network interface configured to utilize carrier aggregation; and
a processor configured to:
for each client station in the plurality of client stations, determine within which coverage area or areas the client station is located, wherein the coverage area or areas are from the coverage areas corresponding to the plurality of frequency bands,
for each of at least client stations in the plurality of client stations determined to be within multiple coverage areas, determine whether the client station is configured to utilize carrier aggregation,
for each client station in the plurality of client stations, determine one or more demand factors indicative of a need of the client station for wireless medium resources,
for each client station in the plurality of client stations, and for each frequency band that the client station is within the corresponding coverage area, determine an indication of channel quality corresponding to the channel, at the frequency band, between the base station and the client station, and
jointly (i) allocate wireless medium resources and (ii) assign each client stations in the plurality of stations to at least one of the frequency bands, wherein jointly allocating wireless medium resources and assigning client stations to at least one of the frequency bands is based on (i) the one or more coverage areas corresponding to one or more frequency bands in which each client station is located, (ii) for each of at least some of the client stations, whether the client station is configured to utilize carrier aggregation, (iii) the demand factors, and (iv) the indications of channel quality.

11. A wireless communication device according to claim 10, wherein the processor is configured to jointly allocate wireless medium resources and assign client stations to at least one of the frequency bands according to an optimization scheme.

12. A wireless communication device according to claim 11, wherein the processor is configured to jointly allocate wireless medium resources and assign client stations to at least one of the frequency bands according to an optimization scheme that seeks to maximize a weighted minimum data rate for the client stations.

13. A wireless communication device according to claim 11, wherein the processor is configured to jointly allocate wireless medium resources and assign client stations to at least one of the frequency bands according to an optimization scheme that seeks to maximize a minimum data rate for the client stations.

14. A wireless communication device according to claim 11, wherein the processor is configured to jointly allocate wireless medium resources and assign client stations to at least one of the frequency bands according to an optimization scheme that seeks to maximize a weighted data rate for the client stations.

15. A wireless communication device according to claim 10, wherein the processor is configured to allocate resource blocks to the client stations as part of jointly allocating wireless medium resources and assigning client stations to at least one of the frequency bands, wherein each resource block is a minimum unit of wireless medium allocation.

16. A wireless communication device according to claim 10, wherein the processor is configured to determine one or more demand factors indicative of a need of the client station for wireless medium resources at least by determining a minimum data rate for the client station.

17. A wireless communication device according to claim 10, wherein the processor is configured to determine one or more demand factors indicative of a need of the client station for wireless medium resources at least by determining a weighted data rate for the client station.

18. A wireless communication device according to claim 10, wherein the processor is configured to determine one or more demand factors indicative of a need of the client station for wireless medium resources based on one or more quality of service requirements of the client station.

19. A wireless communication device according to claim 10, wherein the processor is configured to implement computer readable instructions stored in a memory coupled to the processor.

20. A non-transient computer readable storage medium having instructions stored thereon that, when executed by one or more processors, cause the one or more processors to:
- for each client station in a plurality of client stations of a wireless communication system, determine within which coverage area or areas the client station is located, wherein the coverage area or areas are from the coverage areas corresponding to a plurality of frequency bands served by a base station,
- for each of at least client stations in the plurality of client stations determined to be within multiple coverage areas, determine whether the client station is configured to utilize carrier aggregation,
- for each client station in the plurality of client stations, determine one or more demand factors indicative of a need of the client station for wireless medium resources,
- for each client station in the plurality of client stations, and for each frequency band that the client station is within the corresponding coverage area, determine an indication of channel quality corresponding to the channel, at the frequency band, between the base station and the client station, and
- jointly (i) allocate wireless medium resources and (ii) assign each client stations in the plurality of stations to at least one of the frequency bands, wherein jointly allocating wireless medium resources and assigning client stations to at least one of the frequency bands is based on (i) the one or more coverage areas corresponding to one or more frequency bands in which each client station is located, (ii) for each of at least some of the client stations, whether the client station is configured to utilize carrier aggregation, (iii) the demand factors, and (iv) the indications of channel quality.

* * * * *